(12) United States Patent
Kuehn et al.

(10) Patent No.: US 8,811,618 B2
(45) Date of Patent: Aug. 19, 2014

(54) FAST CIPHERING KEY SEARCH FOR WLAN RECEIVERS

(75) Inventors: Ingo Kuehn, Dresden (DE); Uwe Eckhardt, Dresden (DE); Axel Wachtler, Meissen (DE); Falk Tischer, Riesa (DE)

(73) Assignee: GLOBALFOUNDRIES Inc., Grand Cayman (KY)

( * ) Notice: Subject to any disclaimer, the term of this patent is extended or adjusted under 35 U.S.C. 154(b) by 2417 days.

(21) Appl. No.: 10/899,200

(22) Filed: Jul. 26, 2004

(65) Prior Publication Data

US 2005/0169480 A1    Aug. 4, 2005

(30) Foreign Application Priority Data

Jan. 30, 2004 (DE) .......................... 10 2004 004 800

(51) Int. Cl.
*H04L 29/06* (2006.01)

(52) U.S. Cl.
USPC ........... 380/277; 713/153; 713/156; 713/182; 713/183; 713/184; 713/185; 713/186; 726/2; 726/11

(58) Field of Classification Search
USPC .................. 380/277; 713/153, 156, 182–186; 726/2, 11
See application file for complete search history.

(56) References Cited

U.S. PATENT DOCUMENTS

| | | | | |
|---|---|---|---|---|
| 5,319,783 A | * | 6/1994 | Zink et al. ........................ | 700/18 |
| 5,857,214 A | * | 1/1999 | Dey .............................. | 711/212 |
| 5,875,318 A | * | 2/1999 | Langford .......................... | 716/3 |
| 6,031,935 A | * | 2/2000 | Kimmel ......................... | 382/173 |
| 6,097,725 A | * | 8/2000 | Glaise et al. .............. | 370/395.32 |
| 6,400,286 B1 | * | 6/2002 | Cooper ............................ | 341/51 |
| 6,625,145 B1 | * | 9/2003 | Winell ........................... | 370/389 |
| 6,922,410 B1 | * | 7/2005 | O'Connell ..................... | 370/401 |
| 6,928,603 B1 | * | 8/2005 | Castagna et al. .............. | 714/786 |
| 7,069,268 B1 | * | 6/2006 | Burns et al. ..................... | 707/10 |
| 7,069,444 B2 | * | 6/2006 | Lowensohn et al. .......... | 713/185 |
| 7,921,088 B1 | * | 4/2011 | Mittal ........................... | 707/693 |

(Continued)

FOREIGN PATENT DOCUMENTS

EP     11 43 659     10/2001

OTHER PUBLICATIONS

Cam-Winget et al. "Security Flaws in 802.11 Data Link Protocols." Communications of the ACM: May 2003. http://www.cs.berkeley.edu/~daw/papers/wireless-cacm.pdf.*
Branch, J.W. et al. "Automatic 802.11 wireless LAN security auditing." IEEE Security & Privacy Magazine: pp. 56-65. May-Jun. 2004.*
Arkko, Jari et al. "Securing IPv6 neighbor and router discovery." WiSE '02 Proceedings of the 1st ACM workshop on Wireless security; pp. 77-86. Sep. 28, 2002.*

(Continued)

*Primary Examiner* — Bradley Holder
*Assistant Examiner* — Kari Schmidt
(74) *Attorney, Agent, or Firm* — Meyertons, Hood, Kivlin, Kowert & Goetzel, P.C.; Erik A. Heter

(57) ABSTRACT

A ciphering key management technique for use in a WLAN receiver is provided where a hash table is stored that has a first and a second table portion. The first table portion stores transmitter address data and the second table portion stores at least one cipher key. It is determined whether a transmitter address matches transmitter address data in the first table portion, and if so, a corresponding cipher key stored in the second table portion is determined for use in decrypting the received data. The hash table technique allows for a fast search for the correct cipher key. Embodiments are described that allow for dynamically adding and removing keys without blocking the search.

49 Claims, 5 Drawing Sheets

(56) References Cited

U.S. PATENT DOCUMENTS

| | | | |
|---|---|---|---|
| 2002/0184489 A1* | 12/2002 | Mraz | 713/153 |
| 2004/0185845 A1* | 9/2004 | Abhishek et al. | 455/422.1 |
| 2005/0021979 A1* | 1/2005 | Wiedmann et al. | 713/182 |
| 2006/0174336 A1* | 8/2006 | Chen | 726/11 |

OTHER PUBLICATIONS

Translation of Official Communication issued on Oct. 17, 2008 for German Patent Application No. 10 2004 004 800.2 Entitled "Schnelle Chiffrierschluesselsuche Fuer WLAN-Empfaenger" applicant: Advanced Micro Devices, Inc.

* cited by examiner

FAST CIPHERING KEY SEARCH FOR WLAN RECEIVERS

BACKGROUND OF THE INVENTION

1. Field of the Invention

The present invention relates to WLAN (Wireless Local Area Network) receivers and, more particularly, to ciphering key management techniques that control the use of cipher keys for decrypting received data.

2. Description of the Related Art

A wireless local area network is a flexible data communication system implemented as an extension to or as an alternative for a wired LAN. Using radio frequency or infrared technology, WLAN systems transmit and receive data over the air, minimizing the need for wired connections. Thus, WLAN systems combine data connectivity with user mobility.

Today, most WLAN systems use spread spectrum technology, a wide band radio frequency technique developed for use in reliable and secure communication systems. The spread spectrum technology is designed to trade off bandwidth efficiency for reliability, integrity and security. Two types of spread spectrum radio systems are frequently used: frequency hopping and direct sequence systems.

The standard defining and governing wireless local area networks that operate in the 2.4 GHz spectrum is the IEEE 802.11 standard. To allow higher data rate transmissions, the standard was extended to 802.11b, which allows data rates of 5.5 and 11 Mbps in the 2.4 GHz spectrum. Further extensions exist.

In order to address existing security gaps of the 802.11 standard's native security, i.e. the WEP (Wired Equivalent Privacy) protocol, the 802.11i security standard was developed. This enhanced security standard relies on the 802.1x standard for port-based access control, and the TKIP (Temporal Key Integrity Protocol) and CCMP (Counter-mode Cipher block chaining Message authentication code Protocol) protocols for data frame encapsulation and decapsulation. 802.1x provides a framework for WLAN station authentication and cryptographic key distribution, both features originally missing from the 802.11 standard. The TKIP and CCMP protocols are cipher protocols providing enhanced communication security over the original WEP protocol, the TKIP protocol being targeted at legacy equipment, and the CCMP protocol being targeted at future WLAN equipment.

According to both cipher protocols, there is generated an individual character string for each data frame used for encrypting the data frame. This encryption character string is based on a packet number or sequence number inserted in the data frame indicating data frame ordering. Out of order data frames are discarded. Further, the encryption character string depends on the MAC (Medium Access Control) addresses of the communicating WLAN counterparts, e.g., a WLAN station and a WLAN access point. At the transmitting WLAN counterpart, an integrity value is calculated from the original plaintext frame data and is inserted into the data frame during encapsulation in order to allow the receiving WLAN counterpart to verify whether the decapsulated frame data are identical to the original plaintext frame data. According to the TKIP and CCMP protocols, this integrity value is not only a simple CRC (Cyclic Redundancy Check) checksum, but is generated using a cryptographic MIC (Message Integrity Code) calculation.

When receiving decrypted data in a WLAN receiver applying WEP, TKIP and/or CCMP, or any other scheme, the cipher key needs to be determined for the respective transmitter. This cipher key must be stored at the receiver, potentially together with other cipher keys that relate to different transmitters. That is, the WLAN receiver needs to perform a search to determine the correct cipher key.

Prior art receivers therefore perform a software-driven serial search through all available cipher keys that are stored at the receiver. This technique has been proven to be quite inefficient, as the time needed to serially search through all of the available data may be substantially long in certain circumstances. Moreover, to perform the serial search, a significant data amount needs to be buffered, particularly in cases where a large number of cipher keys are already stored at the receiver. As the prior art systems use software solutions to determine the correct cipher key, there may also be problems with accuracy and precision in performing the determination.

SUMMARY OF THE INVENTION

An improved ciphering key management technique for WLAN receivers is provided that may significantly improve efficiency by speeding up the cipher key search and in addition, reducing the amount of memory needed.

In one embodiment, there is provided a WLAN receiver that comprises a ciphering key management unit for controlling use of cipher keys for decrypting received data. The ciphering key management unit comprises a memory unit for storing a hash table that has a first and a second table portion. The first table portion stores transmitter address data, and the second table portion stores at least one cipher key. The ciphering key management unit is arranged for determining whether a transmitter address matches transmitter address data in the first table portion, and if so, determining a corresponding cipher key stored in the second table portion for use in decrypting the received data.

In another embodiment, a ciphering key management apparatus is provided for controlling use of cipher keys for decrypting data received by a WLAN receiver. The ciphering key management apparatus comprises a memory unit for storing a hash table that has a first and a second table portion. The first table portion stores transmitter address data, and the second table portion stores at least one cipher key. The ciphering key management apparatus further comprises a control unit for determining whether a transmitter address matches transmitter address data in the first table portion, and if so, determining a corresponding cipher key stored in the second table portion for use in decrypting the received data.

In a further embodiment, there is provided an integrated circuit chip for use in a WLAN receiver to perform ciphering key management to control use of cipher keys for decrypting data received by the WLAN receiver. The integrated circuit chip comprises a memory circuit for storing a hash table having a first and a second table portion. The first table portion stores transmitter address data, and the second table portion stores at least one cipher key. The integrated circuit chip further comprises a control circuit for determining whether a transmitter address matches transmitter address data in the first table portion, and if so, determining a corresponding cipher key stored in the second table portion for use in decrypting the received data.

According to still another embodiment, there is provided a method of controlling use of cipher keys for decrypting data in a WLAN receiver. The method comprises accessing a hash table having a first and a second table portion. The first table portion stores transmitter address data, and the second table portion stores at least one cipher key. The method further comprises determining whether a transmitter address matches transmitter address data in the first table portion, and if so, determining a corresponding cipher key stored in the second table portion for use in decrypting the received data.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings.

Figure 1:
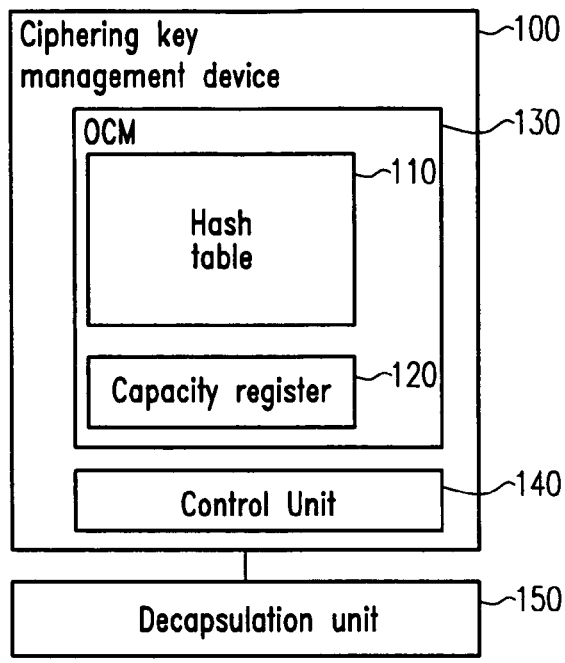
FIG. 1 is a block diagram illustrating components of a WLAN receiver according to an embodiment, including a ciphering key management unit and a decapsulation unit.

Turning now to the figures, and in particular to FIG. 1 which illustrates in more detail a ciphering key management unit 100 of a WLAN receiver according to an embodiment, a key management technique is provided that is implemented in hardware using a hash table 110. To implement the hash table 110, the ciphering key management unit 100 has a memory unit 130 that may be an OCM (On-Chip Memory) device in one embodiment.

The memory unit 130 may further comprise a capacity register 120 that stores data indicating one or more memory dimensions of the hash table 110. Examples of such information will be given in more detail below. It is noted that the capacity register 120 may be provided outside the memory unit 130 but within the ciphering key management unit 100, or even in a separate storage which is independent from the ciphering key management unit 100.

As shown in FIG. 1, the ciphering key management unit 100 may further comprise a control unit 140 that controls the operation of the ciphering key management unit 100. In particular, the control unit 140 may access the hash table 110 to determine a correct cipher key that is stored in the hash table 110. This will be described in more detail below.

Figure 2:
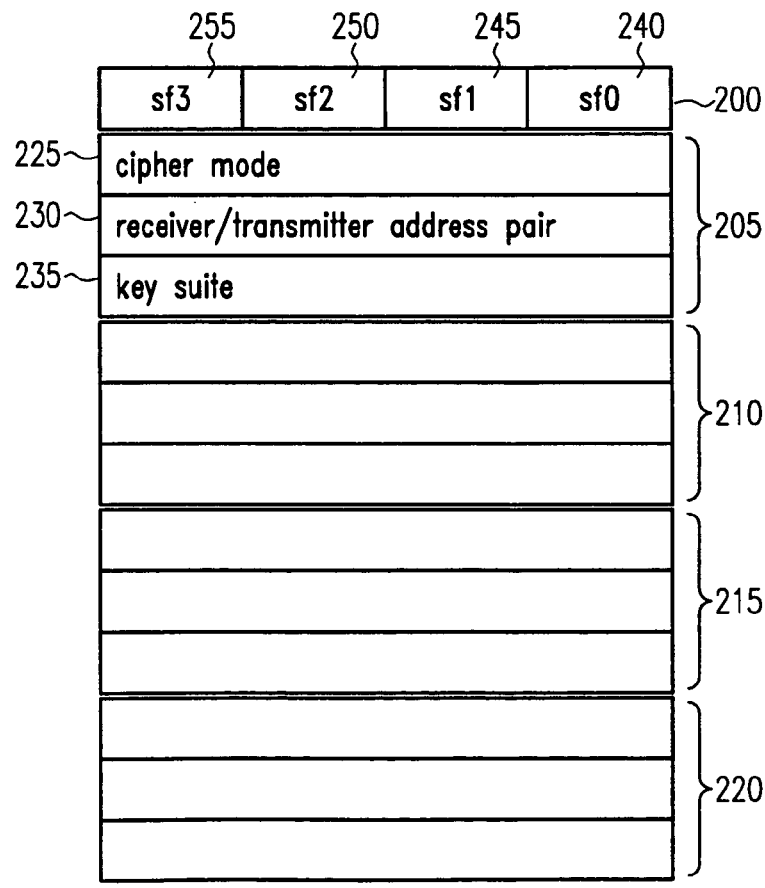
FIG. 2 illustrates a hash table according to an embodiment.

FIG. 2 illustrates the contents of the hash table 110 according to an embodiment. As may be seen from the figure, the hash table 110 has a first table portion 200 and a second table portion 205-220. The first table portion 200 is of the size of one hash line in the present embodiment. The second table portion comprises two or more (e.g. four) alternative hash entries 205, 210, 215, 220 that each have a fixed size which is independent from the length of the hash table 110. In the present embodiment, each hash table entry 205, 210, 215, 220 is three hash lines in size.

Discussing now the first table portion 200, this hash line is divided into a number of sub-fields sf0-sf3 which are depicted in FIG. 2 as memory blocks 240-255. In the present embodiment, four sub-fields are provided in the first table portion 200. In another embodiment, the number of sub-fields may be two, eight, sixteen, thirty-three or any other power-two number different from four. The capacity register 120 may store an integer number where the number of sub-fields is given by two to the power of this integer number. The number of sub-fields may be dynamically changed by software instructions that write to the capacity register 120.

The second table portion of the embodiment shown in FIG. 2 has four table entries 205-220 that each relate to one of the sub-fields 240-255 of the first table portion 200. That is, the number of sub-fields 240-255 corresponds to the length of the hash table 110.

Each sub-field 240-255 may contain n lower bits of the transmitter address. Each table entry 205-220 may contain the receiver/transmitter address pair 230 where the transmitter address corresponds to the transmitter address data stored in the respective sub-field 240-255. As will be described in more detail below, the control unit 140 of the ciphering key management unit 100 first reads the hash line 200 for searching a cipher key, and compares the sub-fields 240 to 255 with the last n bits of the transmitter address of an incoming frame. If it matches, the search was successful. If there are multiple matches of n bits, all matching entries 205-220 are checked against the transmitter address.

As shown in FIG. 2, each hash table entry 205-220 of the second table portion further stores information 225 specifying a cipher mode, and the key suite 235.

While in the embodiment of FIG. 2 each hash table entry 205-220 of the second table portion is three hash lines in size, with one hash line storing cipher mode information, another hash line storing the receiver/transmitter address pair, and the third hash line storing the key suite, the hash table entries 205-220 may also be structured in a different manner in further embodiments. One further embodiment of a hash table entry is shown in FIG. 3.

Figure 3:
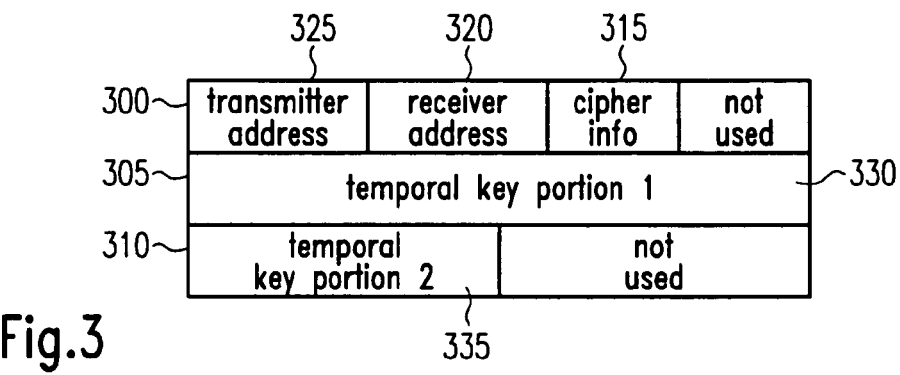
FIG. 3 illustrates a hash table entry according to another embodiment.

As in the embodiment of FIG. 2, the hash table entry of FIG. 3 comprises three hash lines 300-310. The first hash line 300 stores cipher information in field 315 which may be four bits in length. The first hash line 300 further has two fields 320, 325 for storing the receiver and transmitter addresses, respectively. In the present embodiment, each of the address fields is 48 bits wide.

While the first hash line 300 is shown to have an additional field which is marked to be not used, this field may store enable information in another embodiment, for allowing the handling of cipher suite tables that are not power-two in size, but e.g. five. In this case, the enable field is checked after matching with the hash.

Hash lines 305 and 310 store temporal keys in fields 330 and 335. In an embodiment, the temporal key portion 1 stored in field 330 is 128 bits long, i.e. it fills a complete hash line. The temporal key stored in this field may be a 16 byte key for CCMP-AES (Advanced Encryption Standard) or TKIP. For WEP-40 or WEP-104, the lower 40 or 104 bits may contain the key. The transmitter key portion 2 in field 335 is 64 bits in length in the present embodiment and may be used for TKIP. In the present embodiment, the third hash line 310 is not used for CCMP-AES and WEP.

Figure 4:
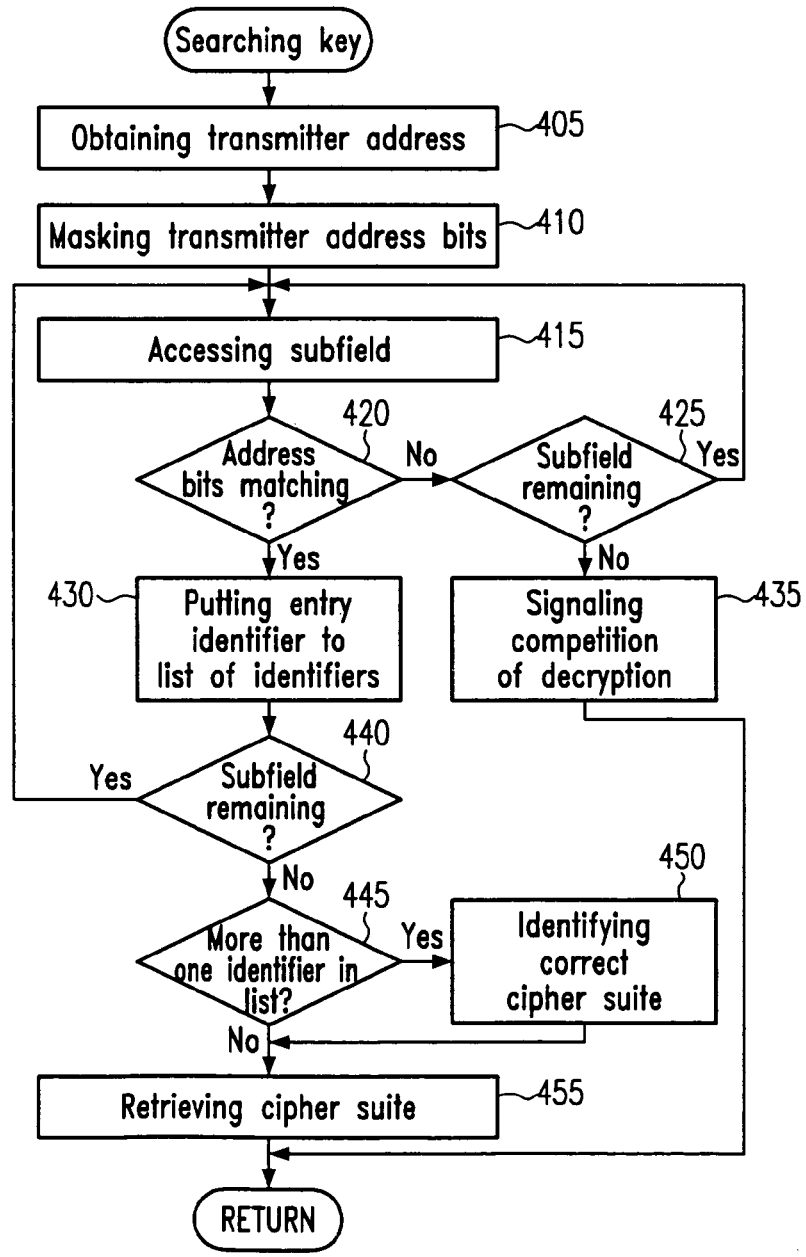
FIG. 4 is a flow chart illustrating a process of searching a cipher key according to an embodiment.

Turning now to FIG. 4, a flow chart is depicted for illustrating the key search process according to an embodiment. In step 405, the transmitter address is obtained from evaluating an incoming data frame. The obtained transmitter address is then masked in step 410 to determine the n lower bits of the address.

It is to be noted that the number n may depend on the number of hash table entries 205-220, i.e. on the length of the hash table 110. That is, the longer the table, the less bits n are comprised in one sub-field 240-255.

Once the transmitter address bits are masked in step 410, the process continues with accessing each sub-field 240-255 of the first table portion 200 of the hash table 110. As shown in FIG. 4, a sub-field is accessed in step 415 to determine, in step 420, whether the masked address bits match. If there is no match, it is determined in step 425 whether there is a sub-field remaining. If so, the process returns to access the next sub-field in step 415. If there is no sub-field remaining, the search was not successful. In this case, step 435 signals the completion of decryption.

If it was determined in step 420 that the masked bits match the transmitter address data of the respective sub-field, an entry identifier is put to a list of identifiers in step 430. This list may for instance be held in the memory unit 130. Similar to step 425, step 440 then determines whether there is still a sub-field remaining. That is, at the end of this loop, the list of identifiers includes identifiers for each hash table entry 205-220 where the corresponding transmitter address data in the respective sub-fields match the lower bits of the transmitter address of the incoming frame.

It is then determined in step 445 whether the list of identifiers includes one identifier or more than one identifier. If there is only one identifier in the list, the respective cipher suite is retrieved in step 455. If more than one identifier is found in the list, all matching entries are checked against the transmitter address in step 450 to identify the correct cipher suite. In an embodiment, it is determined whether the receiver/transmitter address pair completly matches. The identified cipher suite is then retrieved in step 455.

If at the end of the process of FIG. 4 a cipher suite has been retrieved, the cipher suite may be applied to decapsulate the frame in unit 150 using a decapsulation scheme appropriately relating to the information indicating to the cipher mode as found in the respective hash table entry.

As apparent from the foregoing description of the various embodiments, the provision of a hash table that has a first and a second table portion for storing transmitter address data and cipher keys in hash table entries may lead to a faster search for cipher keys, and therefore improves efficiency while requiring only little memory. Moreover, the hash table of the embodiments may further provide for dynamically adding and removing keys without blocking the search. The dynamic update will now be described with reference to FIGS. 5 to 8.

Figure 5:
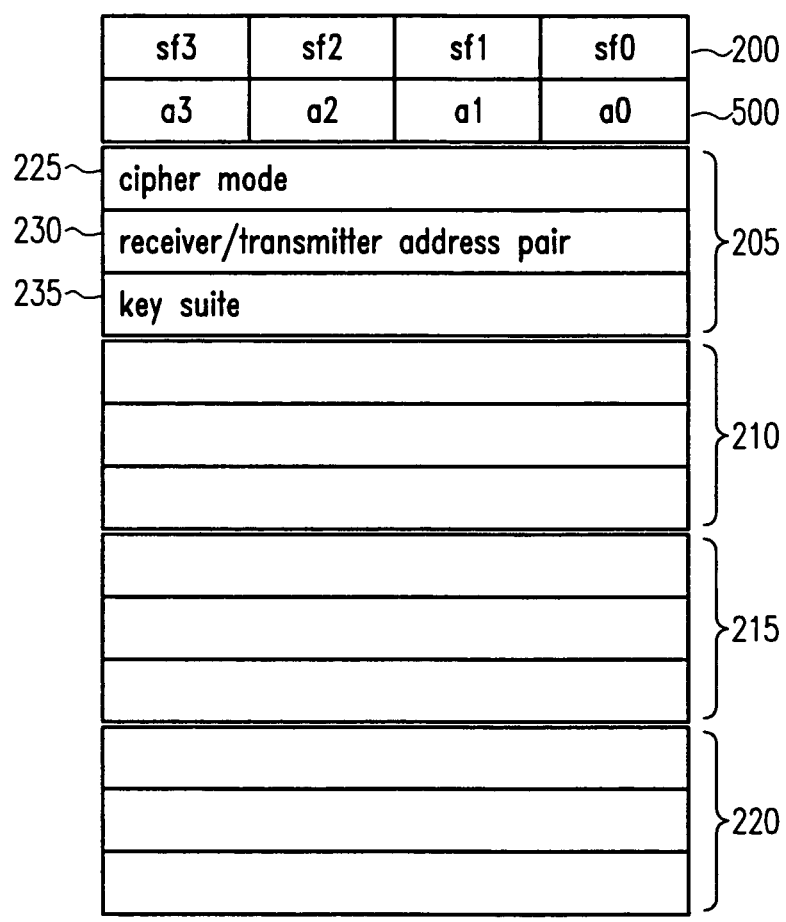
FIG. 5 illustrates a hash table according to another embodiment.

Turning first to the hash table according to the embodiment of FIG. 5, the table differs from that of FIG. 2 in that there is an additional hash line 500 provided which contains activation data. In the embodiment of FIG. 5, the hash line 500 includes four sub-fields, each indicating whether the corresponding sub-field in the first hash line 200 is presently active or not. As will be described below, setting a sub-field of the first hash line 200 inactive may be advantageous when adding or removing keys from the hash table, since this may prevent the search from being blocked.

It is to be noted that the activation information stored in hash line 500 of the hash table of FIG. 5 may, in another embodiment, be stored outside the hash table 110 in one or more externally provided registers. Further, the activation information may be stored as flags within the respective sub-fields of the first hash line 200. In yet another embodiment, activation information is not explicitly stored, but deduced from the fact whether data is stored in the respective sub-field of the first hash line 200, or in the manner how this data is stored in the respective sub-field.

Figure 6:
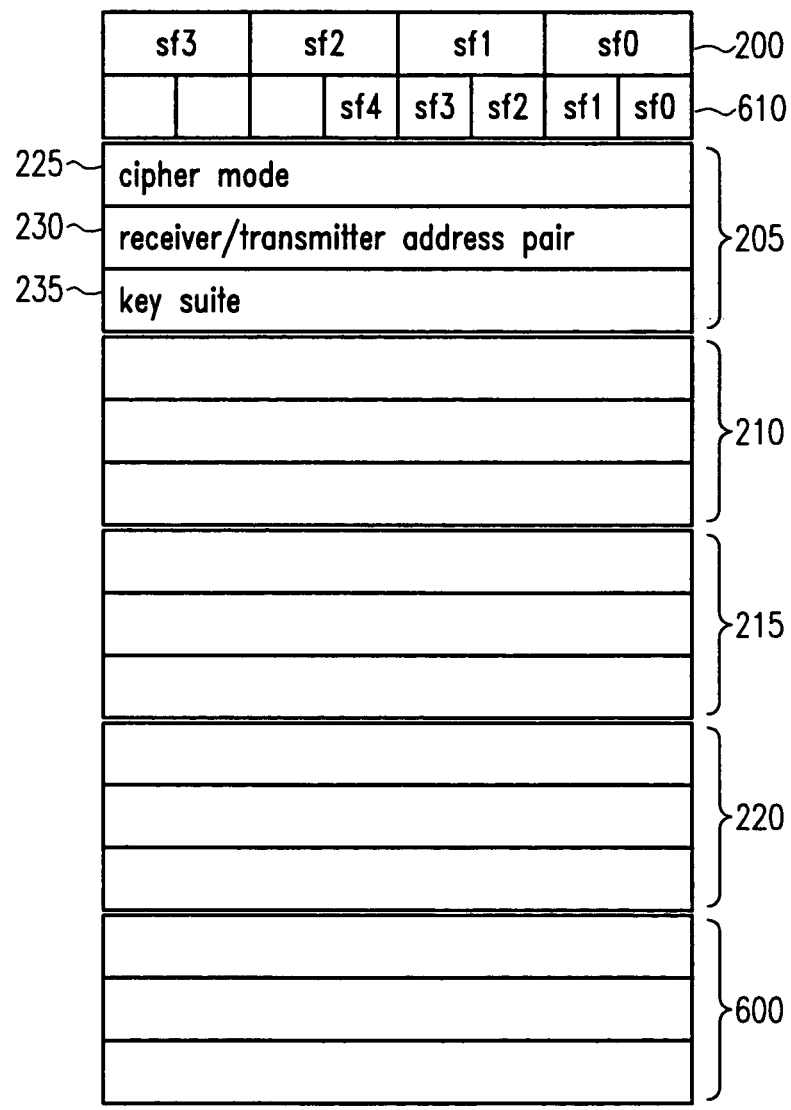
FIG. 6 depicts the hash table of FIG. 2 where a hash table entry has been added.

Referring now to FIG. 6, an example is provided according to another embodiment where starting from the hash table of FIG. 2, a new hash table entry 600 is added to the second table portion of the hash table. As the number of hash table entries (and sub-fields) in the hash table of FIG. 2 was four, which is a power-two number, the integer number in the capacity register 120 needs to be increased from two to three. That is, for having a fifth hash table entry 600 added to the hash table 110, the maximum number of sub-fields is increased from four (i.e. two to the power of two) to eight (i.e. two to the power of three). As there will be only five hash table entries in the second table portion, three sub-fields will be empty or set inactive. That is, only five of the eight sub-fields will be used.

As apparent from FIG. 6, the dynamic update may be performed by adding a new hash line 610 storing the new sub-fields, rather than replacing the existing sub-fields in hash line 200. The previous hash line 200 may be deleted from the hash table 110 once the table entry 600 has been successfully added.

Figure 7:
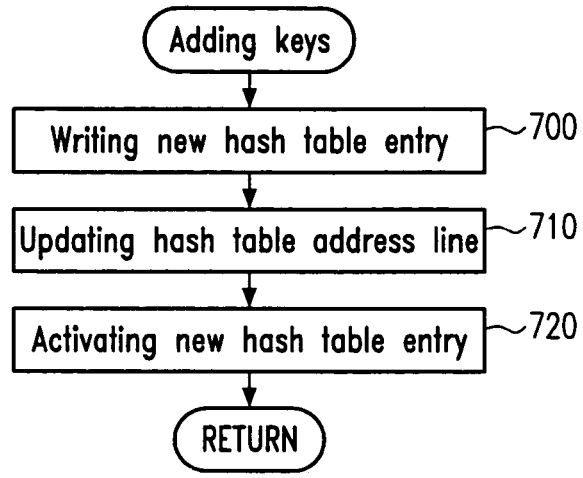
FIG. 7 is a flow chart illustrating a process of adding a cipher key to the hash table according to an embodiment.
Figure 8:
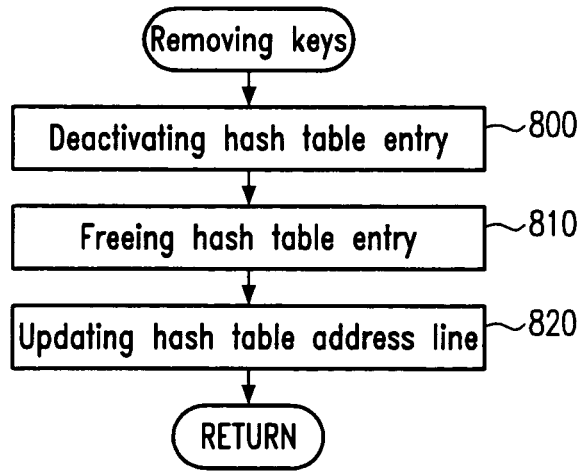
FIG. 8 is a flow chart illustrating the process of removing a cipher key from the hash table according to an embodiment.

FIGS. 7 and 8 show processes of adding and removing keys according to an embodiment. When trying to add a key to the hash table, the new hash table entry 600 is written to the second table portion of the hash table in step 700. The hash table address line is then updated in step 710, and the new hash table entry 600 is activated in step 720. As apparent from the foregoing description, this may be done, for instance, using activation information registers. If the addition of a new key leads to a dynamic update of the integer number in the capacity register 120, steps 710 and 720 may include the temporary addition of another hash line 610.

When removing a key, the respective hash table entry is first deactivated in step 800. The hash table entry to be removed is then freed in step 810, and the hash table address line 200 is updated. In another embodiment, the sequence of steps 810 and 820 may be changed.

Given the embodiments of FIGS. 5 to 8, a blocking-free access mechanism is guaranteed by two hash entries, where entries of the tables are written to first (i.e. updated) and the new hash line is then updated and finally activated. Each table entry can be set to be invalid to ensure that there are no meta-stable states.

As apparent from the foregoing, the embodiments allow for a fast search in hardware on a table, and may be applied for the 802.11 protocol. Dynamic adding and removing of keys is possible without blocking the search.

The embodiments may be used when applying WEP, TKIP, CCMP or any other scheme. With WEP, frames with key index and default keys may be differentiated.

While the invention has been described with respect to the physical embodiments constructed in accordance therewith, it will be apparent to those skilled in the art that various modifications, variations and improvements of the present invention may be made in light of the above teachings and within the purview of the appended claims without departing from the spirit and intended scope of the invention. In addition, those areas in which it is believed that those of ordinary skill in the art are familiar have not been described herein in order to not unnecessarily obscure the invention described herein. Accordingly, it is to be understood that the invention is not to be limited by the specific illustrative embodiments, but only by the scope of the appended claims.

The invention claimed is:

1. A WLAN (Wireless Local Area Network) receiver comprising:
   a ciphering key management circuit configured to control use of cipher keys for decrypting received data, wherein said ciphering key management circuit comprises a memory circuit configured to store a hash table having a first and a second set of entries, said first set of entries including transmitter address data comprised of a predetermined number of lower bits of a respective transmitter address, said second set of entries including at least one cipher key, wherein said ciphering key management circuit is configured to determine whether a transmitter address obtained from an incoming data frame matches said transmitter address data in said first set of entries, and if so, determine a cipher key corresponding to the transmitter address, wherein the cipher key is included in said second set of entries and is configured for use in decrypting said received data;
   wherein said transmitter address data included in said first set of entries is comprised of a number of lower bits of a respective transmitter address, wherein said first set of entries comprises a number of sub-fields, each configured to store transmitter address data of a different transmitter, wherein the ciphering key management circuit is configured to dynamically change the number of sub-fields by executing software instructions, and wherein said ciphering key management circuit is configured to reduce said number of lower bits responsive to an increase in said number of sub-fields;
   wherein said second set of entries comprises a number of table entries each configured to store at least one cipher key pertaining to a different transmitter, wherein each table entry has a fixed length independent from the length of the hash table;
   wherein the length of the hash table is given by the length of said first set of entries and the length of said second set of entries, said length of said second set of entries being dependent on said fixed length of said table entries and the number of table entries in said second set of entries, wherein the number of active sub-fields in said first set of entries is equal to the number of table entries in said second set of entries.

2. The WLAN receiver of claim 1, further comprising:
   a data decapsulation circuit for decapsulating incoming data using said determined cipher key.

3. The WLAN receiver of claim 2, wherein said decapsulation circuit is configured to apply CCMP-AES (Counter-mode Cipher block chaining Message authentication code Protocol-Advanced Encryption Standard) procedures.

4. The WLAN receiver of claim 2, wherein said decapsulation circuit is configured to apply TKIP (Temporal Key Integrity Protocol) procedures.

5. The WLAN receiver of claim 2, wherein said decapsulation circuit is configured to apply WEP-40 (Wired Equivalent Privacy) procedures.

6. The WLAN receiver of claim 2, wherein said decapsulation circuit is configured to apply WEP-104 (Wired Equivalent Privacy) procedures.

7. The WLAN receiver of claim 2, wherein said data decapsulation circuit is configured to perform data frame decapsulation.

8. The WLAN receiver of claim 1, wherein said memory is an OCM (On-Chip Memory) configured to be controlled by software.

9. The WLAN receiver of claim 1, wherein said first set of entries is a hash line of said hash table.

10. The WLAN receiver of claim 1, wherein said ciphering key management circuit is configured to selectively mark individual sub-fields in said first set of entries active or inactive.

11. The WLAN receiver of claim 1, wherein said number of sub-fields in said first set of entries is a power-two number.

12. The WLAN receiver of claim 1, wherein said ciphering key management circuit further comprises a capacity register configured to store an integer number, wherein said number of sub-fields in said first set of entries and the maximum number of table entries in said second set of entries are given by two to the power of said integer number.

13. The WLAN receiver of claim 1, wherein each sub-field in said first set of entries relates to an individual table entry in said second set of entries.

14. The WLAN receiver of claim 1, wherein each table entry in said second set of entries is configured to store a receiver/transmitter address pair.

15. The WLAN receiver of claim 1, wherein each table entry in said second set of entries is configured to store data indicating one of at least two different cipher modes.

16. The WLAN receiver of claim 15, wherein one of said at least two cipher modes is a CCMP-AES (Counter-mode Cipher block chaining Message authentication code Protocol-Advanced Encryption Standard) cipher mode.

17. The WLAN receiver of claim 15, wherein one of said at least two cipher modes is a TKIP (Temporal Key Integrity Protocol) cipher mode.

18. The WLAN receiver of claim 15, wherein one of said at least two cipher modes is a WEP (Wired Equivalent Privacy) cipher mode.

19. The WLAN receiver of claim 1, wherein said ciphering key management circuit is further configured to compare said transmitter address with a transmitter address stored in said second set of entries, to determine said cipher key.

20. The WLAN receiver of claim 19, wherein said ciphering key management circuit is further configured to compare said transmitter address with two or more transmitter addresses stored in said second set of entries, to determine said cipher key.

21. The WLAN receiver of claim 1, wherein said hash table further has a third set of entries configured to store activation information, said activation information indicating whether transmitter address data in said first set of entries is active or not.

22. The WLAN receiver of claim 1, wherein said ciphering key management circuit is configured to add a cipher key to said second set of entries by writing said cipher key to said second set of entries, writing corresponding transmitter address data to said first set of entries, and then activating said written transmitter address data.

23. The WLAN receiver of claim 1, wherein said ciphering key management circuit is configured to add a cipher key from said second set of entries by deactivating corresponding transmitter address data, and then deleting the cipher key from said second set of entries and the transmitter address data from said first set of entries.

24. A ciphering key management circuit for controlling use of cipher keys for decrypting data received by a WLAN (Wireless Local Area Network) receiver, said ciphering key management circuit comprising:
   a memory circuit configured to store a hash table having a first and a second set of entries, said first set of entries including transmitter address data comprised of a predetermined number of lower bits of a respective transmitter address, said second set of entries including at least one cipher key; and a control circuit configured to determine whether a transmitter address obtained from an incoming data frame matches said transmitter address data in said first set of entries, and if so, determine a cipher key corresponding to the transmitter address, wherein said cipher key is included in said second set of entries and configured for use in decrypting said received data;

wherein said transmitter address data included in said first set of entries is comprised of a number of lower bits of a respective transmitter address, wherein said first set of entries comprises a number of sub-fields, each configured to store transmitter address data of a different transmitter, wherein the ciphering key management circuit is configured to dynamically change the number of sub-fields by executing software instructions, and wherein said ciphering key management circuit is configured to reduce said number of lower bits responsive to an increase in said number of sub-fields;

wherein said second set of entries comprises a number of table entries each configured to store at least one cipher key pertaining to a different transmitter, wherein each table entry has a fixed length independent from the length of the hash table;

wherein the length of the hash table is given by the length of said first set of entries and the length of said second set of entries, said length of said second set of entries being dependent on said fixed length of said table entries and the number of table entries in said second set of entries, wherein the number of active sub-fields in said first set of entries is equal to the number of table entries in said second set of entries.

25. An integrated circuit chip for use in a WLAN (Wireless Local Area Network) receiver to perform ciphering key management to control use of cipher keys for decrypting data received by said WLAN receiver, said integrated circuit chip comprising:

a memory circuit configured to store a hash table having a first and a second set of entries, said first set of entries storing transmitter address data comprised of a predetermined number of lower bits of a respective transmitter address, said second set of entries storing at least one cipher key; and a control circuit configured to determine whether a transmitter address obtained from an incoming data frame matches said transmitter address data in said first set of entries, and if so, determine a cipher key corresponding to said transmitter address, wherein said cipher key is included in said second set of entries and configured for use in decrypting said received data;

wherein said transmitter address data included in said first set of entries is comprised of a number of lower bits of a respective transmitter address, wherein said first set of entries comprises a number of sub-fields each configured to store transmitter address data of a different transmitter, wherein the integrated circuit chip is configured to dynamically change the number of sub-fields by executing software instructions, and wherein said ciphering key management circuit is configured to reduce said number of lower bits responsive to an increase in said number of sub-fields;

wherein said second set of entries comprises a number of table entries each configured to store at least one cipher key pertaining to a different transmitter, wherein each table entry has a fixed length independent from the length of the hash table;

wherein the length of the hash table is given by the length of said first set of entries and the length of said second set of entries, said length of said second set of entries being dependent on said fixed length of said table entries and the number of table entries in said second set of entries, wherein the number of active sub-fields in said first set of entries is equal to the number of table entries in said second set of entries.

26. A method of controlling use of cipher keys for decrypting received data in a WLAN (Wireless Local Area Network) receiver, said method comprising:

accessing, by a processing circuit, a hash table having a first and a second set of entries, said first set of entries storing transmitter address data comprised of a predetermined number of lower bits of a respective transmitter address, said second set of entries storing at least one cipher key;

determining whether a transmitter address obtained from an incoming data frame matches said transmitter address data in said first set of entries; and if so, determining a corresponding cipher key stored in said second set of entries for use in decrypting said received data;

wherein said transmitter address data stored in said first set of entries is comprised of a number of lower bits of a respective transmitter address, said first set of entries comprises a number of sub-fields each configured to store transmitter address data of a different transmitter, the number of sub-fields being dynamically changeable by software instructions executed by the WLAN receiver, and wherein the method further comprises reducing said number of lower bits responsive to an increase in said number of sub-fields;

wherein said second set of entries comprises a number of table entries each configured to store at least one cipher key pertaining to a different transmitter, wherein each table entry has a fixed length independent from the length of the hash table;

wherein the length of the hash table is given by the length of said first set of entries and the length of said second set of entries, said length of said second set of entries being dependent on said fixed length of said table entries and the number of table entries in said second set of entries, wherein the number of active sub-fields in said first set of entries is equal to the number of table entries in said second set of entries.

27. The method of claim 26, further comprising:
decapsulating incoming data using said deteiinined cipher key.

28. The method of claim 27, wherein said decapsulation applies CCMP-AES (Counter-mode Cipher block chaining Message authentication code Protocol-Advanced Encryption Standard) procedures.

29. The method of claim 27, wherein said decapsulation applies TKIP (Temporal Key Integrity Protocol) procedures.

30. The method of claim 27, wherein said decapsulation applies WEP-40 (Wired Equivalent Privacy) procedures.

31. The method of claim 27, wherein said decapsulation applies WEP-104 (Wired Equivalent Privacy) procedures.

32. The method of claim 27, wherein said decapsulation is a data frame decapsulation.

33. The method of claim 26, wherein said step of accessing said hash table comprises accessing an OCM (On-Chip Memory) circuit by performing software instructions.

34. The method of claim 26, wherein said first set of entries is a hash line of said hash table.

35. The method of claim 26, further comprising:
selectively marking individual sub-fields in said first set of entries active or inactive.

36. The method of claim 35 further comprising marking a selected subfield inactive prior to removing its corresponding hash table entry.

37. The method of claim 26, wherein said number of sub-fields in said first set of entries is a power-two number.

38. The method of claim 26, further comprising:
accessing a capacity register storing an integer number; and
setting the number of sub-fields in said first set of entries and the maximum number of table entries in said second set of entries to be two to the power of said integer number.

39. The method of claim 26, wherein each sub-field in said first set of entries relates to an individual table entry in said second set of entries.

40. The method of claim 26, wherein each table entry in said second set of entries is configured to store a receiver/transmitter address pair.

41. The method of claim 26, wherein each table entry in said second set of entries is configured to store data indicating one of at least two different cipher modes.

42. The method of claim 41, wherein one of said at least two cipher modes is a CCMP-AES (Counter-mode Cipher block chaining Message authentication code Protocol-Advanced Encryption Standard) cipher mode.

43. The method of claim 41, wherein one of said at least two cipher modes is a TKIP (Temporal Key Integrity Protocol) cipher mode.

44. The method of claim 41, wherein one of said at least two cipher modes is a WEP (Wired Equivalent Privacy) cipher mode.

45. The method of claim 26, further comprising:
comparing said transmitter address with a transmitter address stored in said second set of entries, to determine said cipher key.

46. The method of claim 45, wherein said transmitter address is compared with two or more transmitter addresses stored in said second set of entries.

47. The method of claim 26, wherein said hash table further has a third set of entries for storing activation information, said activation information indicating whether transmitter address data in said first set of entries is active or not.

48. The method of claim 26 wherein a cipher key is added to said second set of entries by performing the steps of:
writing said cipher key to said second set of entries;
writing corresponding transmitter address data to said first set of entries; and
activating said written transmitter address data in said third set of entries.

49. The method of claim 26 wherein a cipher key is removed from said second set of entries by performing the steps of:
deactivating corresponding transmitter address data; and
deleting the cipher key from said second set of entries, and the transmitter address data from said first set of entries.

* * * * *